United States Patent [19]

Loomis

[11] Patent Number: 4,540,719

[45] Date of Patent: Sep. 10, 1985

[54] PROCESS FOR MAKING FOAMED, SULFUR-CURED POLYMER BLEND COMPOSITIONS

[75] Inventor: Gary L. Loomis, Drexel Hill, Pa.

[73] Assignee: E. I. Du Pont de Nemours and Company, Wilmington, Del.

[21] Appl. No.: 692,634

[22] Filed: Jan. 18, 1985

[51] Int. Cl.$^3$ .............................................. C08J 9/06
[52] U.S. Cl. ................................. 521/89; 521/134; 521/189; 525/189; 525/190
[58] Field of Search ............... 521/89, 134, 189; 525/189, 190

[56] References Cited

U.S. PATENT DOCUMENTS

| | | | |
|---|---|---|---|
| 4,172,939 | 10/1979 | Hoh | 528/271 |
| 4,370,423 | 1/1983 | Rys-Sikora | 521/189 |
| 4,391,922 | 7/1983 | Harrell | 521/189 |
| 4,391,923 | 7/1983 | Rys-Sikora | 521/189 |
| 4,394,459 | 7/1983 | Rys-Sikora | 521/189 |
| 4,434,253 | 2/1984 | Rys-Sikora | 521/189 |
| 4,480,054 | 10/1984 | Enderle | 521/189 |

*Primary Examiner*—Morton Foelak
*Attorney, Agent, or Firm*—P. R. Steyermark

[57] ABSTRACT

A blend of an E/X/Y copolymer, where E is ethylene, X is a vinyl ester, and Y is carbon monoxide or sulfur dioxide, with a polymer of vinyl halide or vinylidene halide is foamed and cured by dispersing in the blend a blowing agent and sulfur or a sulfur-releasing agent and heating the blend containing those additives at 100°–180° C. for a sufficient time to produce curing and foaming. This process can be run either continuously or batchwise in conventional equipment under conventional conditions in the presence of air. Plasticizers and other materials which often interfere with peroxide cures can be present in the process of this invention. The foamed and cured products have excellent physical properties and ozone resistance.

9 Claims, No Drawings

PROCESS FOR MAKING FOAMED, SULFUR-CURED POLYMER BLEND COMPOSITIONS

BACKGROUND OF THE INVENTION

1. Field of the Invention

This invention relates to a process for foaming and sulfur-curing blends of an ethylene/vinyl ester/carbon monoxide or ethylene/vinyl ester/sulfur dioxide copolymer with a polyvinyl or polyvinylidene halide, such as, for example, polyvinyl chloride or polyvinylidene chloride.

2. Discussion of Related Art

It is known to foam and cure polymers and polymer blends such as, for example, ethylene/vinyl acetate/carbon monoxide terpolymers or blends of such terpolymers with polyvinyl chloride; see, U.S. Pat. Nos. 4,370,423 and 4,391,923, both to Rys-Sikora. Curing of the foamable polymer compositions of those patents is accomplished by means of free radicals. Those compositions, therefore, contain free radical generators, such as peroxides, peresters, or azides.

It also is known to foam and sulfur-cure diene elastomers such as, for example, natural rubber, SBR, and similar materials. Foams made by such processes are readily available commercially.

Further, it is known to sulfur-cure ethylene/vinyl acetate/carbon monoxide (E/VA/CO) terpolymers, as described in U.S. Pat. No. 4,172,939 to Hoh.

Foaming and curing polymer blends in the manner described in the above-cited Rys-Sikora U.S. Pat. No. 4,391,923 has certain shortcomings. Firstly, free radicals are sensitive to, and are destroyed by, oxygen. As a result, foaming and curing cannot be carried out in the presence of air, for example, in an oven, but normally would be carried out by compression molding, in the absence of air. This, in turn, makes it impossible to produce cured foams by a continuous process, where the composition is at the same time foamed and cured in an oven or a heat tunnel. A second drawback of the free-radical cures is that free radicals are easily consumed by various conventional compounding ingredients, such as, for example, antioxidants, certain extending oils, and plasticizers, and thus quickly become depleted, leaving the composition uncured or only partially cured. Such conventional compounding ingredients are, therefore, often omitted from those compositions.

It is, therefore, desirable to be able to produce foams of such polymer blends by a process which would not suffer from those limitations.

SUMMARY OF THE INVENTION

According to the present invention, there is provided a process for producing, a foamed, cured composition comprising a polymer blend of (1) 5 to 95 parts of a copolymer E/X/Y, wherein E is ethylene;

X is a vinyl ester; and

Y is carbon monoxide or sulfur dioxide;

and (2) 95 to 5 parts of a polymer of a vinyl halide or vinylidene halide, the total amount of polymers (1) plus (2) being 100 parts;

said process comprising: (A) uniformly dispersing in said polymer blend an effective amount of a blowing agent and at least one curing agent selected from (a) about 0.2 to 5 parts of sulfur and (b) about 0.2 to 15 parts of an agent capable of releasing elemental sulfur under the cure conditions; and (B) heating said blend containing the blowing agent and the curing agent at a temperature of about 100°–180° C., at which both foaming and curing take place, for a sufficient time to obtain substantially complete foaming and curing.

There also is provided a foamed and cured composition produced by the above process.

DETAILED DESCRIPTION OF THE INVENTION

The E/X/Y copolymers used in the present invention either are available commercially or can be made according to published information. The vinyl ester comonomer X can be, for example, vinyl acetate, vinyl propionate, vinyl butyrate etc., but the most commonplace comonomer, vinyl acetate, is preferred. An ethylene/vinyl acetate/carbon monoxide terpolymer is available from the assignee of this invention under the trademark Elvaloy ®. The polymer can be made according to the procedures described in U.S. Pat. No. 3,780,140 to Hammer and U.S. Pat. No. 2,495,286 to Brubaker. Other copolymers, in which X is another vinyl ester, can be prepared in the same manner. Sulfur dioxide-containing copolymers can be made by the process of U.S. Pat. No. 3,684,778 to Hammer.

These copolymers can also contain a fourth comonomer, which can be, for example, an ethylenically unsaturated carboxylic acid (for example, acrylic or methacrylic acid), an ester of such an acid, acrylonitrile, or an α-olefin.

The vinyl halide polymer can be, for example, polyvinyl chloride or polyvinyl bromide; and the vinylidene halide polymer can be, for example, polyvinylidene chloride or polyvinylidene bromide. Polyvinyl chloride is commercially available from many sources, including Conoco, Inc., while polyvinylidene chloride is available, for example, from Dow Chemical Co. Other polymers of those types can be made as described, for example, in Encyclopedia of PVC, edited by L. J. Nass, Marcel Dekker, Inc. New York (1976).

The vulcanizing agent that is added to, and dispersed in, the polymer blend is one of those normally employed in the vulcanization of rubber and can be elemental sulfur or a compound that releases sulfur at vulcanization temperatures, i.e., a sulfur donor, or mixtures thereof, which compounds are well known in the industry. Extensive descriptions of sulfur vulcanizing systems that can be used in this invention have been published, for example, in Hofmann, "Vulcanization and Vulcanizing Agents", Palmerton Pub. Co., N.Y. 1967; and Alliger and Sjothun, "Vulcanization of Elastomers", Reinhold Pub. Corp., N.Y., 1964. Representative vulcanizing agents that release sulfur at vulcanization temperatures include thiuram polysulfides, e.g., dipentamethylene thiuram tetrasulfide or hexasulfide, tetramethyl thiuram disulfide; amine disulfides, e.g., di-morpholyl disulfide; sodium polysulfide, and thioplasts. When the temperature of the terpolymer is increased during vulcanization, the sulfur donors liberate part of their loosely bound sulfur which is then consumed in the formation of crosslinks.

Organic accelerators can be, and generally are, used in combination with the vulcanizing agent and dispersed throughout the polymer blend in order to shorten the vulcanization times and lower curing temperatures. Further, the amount of vulcanizing agent can be reduced when a curing accelerator is used. Any conventional accelerator or mixtures thereof normally used to vulcanize rubber can be used in the present invention including: the thiazoles; mercapto accelerators such as mercaptobenzothiazole; and sulphenamide accelerators, e.g., derivatives of mercaptobenzothiazole; guanidine accelerators, e.g., diphenylguanidine (DPG) and di-o-tolylguanidine (DOTG); thiurams, such as thiuram monosulfides and thiuram disulfides; and dithiocarbamates. The amount of accelerator used can vary over a wide range and the amount depends on the particular chemical composition, the accelerator and the intended use of the elastomer. Generally, the amount of accelerator used will be about 0.2–4, preferably 0.5–2 parts, per 100 parts of polymer blend.

Fillers, processing aids, plasticizers, and oils can be added if desired. Among the fillers that can be used, carbon black, calcium carbonate, talc, magnesium oxide, and zinc oxide can be mentioned as quite commonplace in the rubber industry. Zinc oxide also serves as an activator for axodicarbonamide when the latter is used as a blowing agent.

Organic plasticizers of the types used in plasticizing polyvinyl chloride can be used in E/VA/CO terpolymer/polyvinyl chloride blends. Suitable plasticizers include, for example, aryl phosphates such as triphenyl phosphate, phthalate esters such as dioctyl phthalate and tributyl phthalate, trimellitate esters such as tri(2-ethylhexyl)trimellitate, and adipate esters such as diisodecyl adipate. Also see "the Technology of Plasticizers" by J. Kern Sears and Joseph R. Darby, John Wiley and Sons, Pub. (1982). The amount of plasticizer depends on the end use and the stiffness appropriate for the end use, but it preferably should not exceed the level of polyvinyl chloride present in the compositions.

The polymers, fillers, and plasticizers can be mixed in a batch mixer, such as a Banbury mixer, or a continuous mixer, such as a Farrell continuous mixer, at a suitable temperature, usually about 160°–200° C., preferably 165°–175° C. The temperature should be adequate to facilitate mixing but not so high as to cause polymer discoloration or degradation.

The blowing agent, activator, curing agent, and accelerator can be added to the blend on a roll mill, usually at a roll temperature in the range of 50°–130° C. Usually, these materials are not added all at once but gradually, over a period of several minutes. The roll temperature is chosen so as to avoid both premature curing of the polymer blend and decomposition of the blowing agent during the blending operation. The appropriate temperature thus will depend, among others, on the activities of the blowing and curing systems used as well as on the composition and the softening temperature of the blend.

Curing and foaming are carried out simultaneously within a temperature range of about 100° to 180° C. This can be done, for example, in a circulating oven, a salt bath, a hot air tunnel, or another heating arrangement.

The operation can be either batchwise or continuous. When it is continuous, a completly compounded polymer blend composition containing both the curing and the foaming agents, as well as any accelerators and activators, is continuously extruded into the heating zone at a rate such that both foaming and curing are substantially complete at the time the composition leaves the heating zone; the cured material is cooled to ambient temperature, cut into appropriate lengths, if necessary, and removed to a storage area. In a batch operation, one or a series of compression molds are filled with the completely compounded composition and heated to an appropriate temperature for a suitable time to adequately crosslink the polymer and decompose the blowing agent; the mold is then opened and expansion of the foam occurs.

This invention is now illustrated by the following examples of certain representative embodiments thereof, where all parts, proportions and percentages are by weight, unless indicated otherwise. "PVC" stands for polyvinyl chloride. All measurements made and results obtained in units other than SI have been converted to SI units.

EXAMPLE 1

A stabilized polymer blend was prepared as follows:

| Blend Components | % |
|---|---|
| PVC (Firestone FPC-9300), inh. visc. = 0.96 | 46.3 |
| Mark S17, phosphite chelator (Argus Chem. Co.) | 0.5 |
| Ba/Cd laurate (Argus Chem. Co.) | 1.4 |
| Acryloid ® K-120N acrylic fusion aid (Rohm & Haas) | 1.4 |
| Allied 617A (polyethylene wax) | 1.8 |
| Epoxidized soybean oil | 4.6 |
| Calcium carbonate | 11.6 |
| E/VA/CO (65:25:10) terpolymer, melt index = 20 | 32.4 |

The blend was made in two steps. First, all ingredients except the E/VA/CO terpolymer were combined in a high speed dry blender (Welex). This dry blend was then added to a Banbury internal mixer, along with the E/VA/CO terpolymer, and was mixed at high speed for 10–15 minutes at a temperature of 190° C. This material is referred to as polymer blend A.

Four foamable and curable compositions designated a, b, c, and d were prepared by intimately mixing all ingredients on a two-roll rubber mill operating at a temperature below the decomposition temperature of the chemical blowing agent, about 120° C. They were then foamed and cured in a press at 165° C. and a force of 188,000 N.

Compounding and curing information as well as the physical properties of the resulting foams are summarized in Table 1 below.

TABLE 1

| Components | % | | | |
|---|---|---|---|---|
| Polymer Blend A | 64.3 | 81.5 | 85.9 | 74.1 |
| Carbon Black (ASTM-N650) | 25.7 | 6.1 | — | 18.1 |
| Carbon Black (ASTM-N-762) | — | — | 6.4 | — |
| Azodicarbonamide | 2.6 | 4.0 | 3.0 | 2.5 |
| Zinc Oxide | 1.3 | 1.2 | 2.1 | 0.8 |
| Pentaerythritol; particle size 0.075 mm | — | 2.0 | 0.9 | 1.2 |
| Stearic Acid | 0.6 | 0.6 | 0.2 | 0.4 |
| Zinc Stearate | 1.3 | 1.2 | — | 0.7 |
| Sulfur | 0.6 | 0.6 | 0.9 | 0.4 |
| Thiocarbanilide, sulfur cocurative | 0.2 | 0.2 | — | 0.1 |
| Mercaptobenzothiazole | 0.3 | 0.3 | — | 0.2 |
| Zinc dibutyl dithiocar- | 0.6 | 0.6 | — | 0.4 |

TABLE 1-continued

| Components | % | | | |
|---|---|---|---|---|
| bamate | | | | |
| Desical P (80% CaO in hydrocarbon oil), Basic Chemical Co. | 1.9 | 1.8 | — | 1.1 |
| Tellurium diethyl thiocarbamate | 0.2 | 0.2 | — | 0.1 |
| Tetramethylthiuram monosulfide | — | — | 0.1 | — |
| N—cyclohexyl-2-benzothiazole sulfenamide | — | — | 0.4 | — |
| Cure time, min. | 7.0 | 9.0* | 7.0 | 12 |
| Density, g/cm$^3$ | 0.67 | 0.26 | 0.23 | 0.96 |
| Hardness, Durometer A (ASTM D2240-81) | 84 | 31 | 29 | 57 |
| Bashore rebound, % (ASTM D2632-67) | — | 15 | 14 | 13 |

*Plus 60 min postcure in oven at 160° C.

EXAMPLE 2

The stabilized and plasticized polymer blend used in this example was prepared in the manner described in Example 1 from the following components and is referred to as polymer blend B.

| Polymer Blend B | % |
|---|---|
| PVC (Firestone FPC-9300), inh. visc. = 0.96 | 43.82 |
| Phosphite chelator (Argus Chem. Co.) | 0.22 |
| Ba/Cd laurate (Argus Chem. Co.) | 1.10 |
| Epoxidized soybean oil | 2.19 |
| Stearic acid | 0.09 |
| Dioctyl phthalate | 35.06 |
| E/VA/CO (65:25:10) terpolymer, melt index = 20 | 15.34 |

The composition was prepared in two stages using a two-roll rubber mill. The ingredients of part I of the formulation shown in Table 2, below, were blended at a temperature of 150° C. The mill was then allowed to cool to 110° C. and the ingredients of part II of the formulation shown in Table 2 were blended in at that temperature. The curing conditions and physical properties of foams resulting from these compositions also are shown in Table 2.

TABLE 2

| | a | b |
|---|---|---|
| Part I | | |
| Polymer Blend B | 67.10 | 66.73 |
| Calcium Carbonate | 16.77 | 16.68 |
| Satintone Special Clay (Engelhardt) | 6.71 | 6.67 |
| Zinc Oxide | 2.68 | 2.67 |
| Stearic Acid | 1.34 | 1.33 |
| Part II | | |
| Azodicarbonamide | 3.35 | 3.33 |
| Sulfur | 0.94 | 0.93 |
| N—cyclohexyl-2-benzothiazole sulfenamide | 0.67 | 0.67 |
| Mercaptobenzothiazole | 0.34 | 0.33 |
| Tetramethylthiuram monosulfide | 0.13 | 0.13 |
| Pentaerythritol | — | 0.50 |

| Cure conditions and foam properties | | | | | |
|---|---|---|---|---|---|
| | Composition a | | | | Composition b |
| press cure time at 165° C., min. | 6 | — | 6 | 5 | 6 |
| post-cure time in oven at 170° C., min. | — | 6* | 10 | 5 | — |
| density g/cm$^3$ | 0.81 | 0.72 | 0.63 | 0.31 | 0.21 |
| Shore A hardness | 50 | 40 | 49 | 20 | 10 |

*Sample was cut from uncured sheet produced on roll mill and placed directly in an oven at 170° C. to afford a cured, free blown (no compression) foam.

EXAMPLE 3

This example illustrates the preparation of a filled, sulfur-cured, low density, closed cell foam by extrusion and continuous oven cure.

The stabilized polymer blend used in this example had the following composition:

| Polymer Blend C | Parts |
|---|---|
| PVC (Conoco grade 5305, inherent viscosity, 0.75) | 40 |
| Mark XX (liquid phosphite chelator, Argus) | 1.5 |
| Mark XI (Ba/Cd laurate stabilizer, Argus) | 3 |
| Epoxidized soybean oil (Rohm & Haas) | 6 |
| Allied 6A (polyethylene processing aid, Allied) | 6 |
| E/VA/CO (66:24:10) Terpolymer (melt index 35) | 60 |

All of the ingredients in Blend C, except the E/VA/CO terpolymer, were first blended in a high speed mixer (Welex) in 3000 g batches. The dry blend was then placed in a lined drum along with the terpolymer, and the blend was tumble-blended on a drum tumbler. The resulting blend was melt-extruded using a 28 mm single screw extruder operated at 220 rpm with the barrel temperature set at 180°-200° C. and the die temperature at about 220°-230° C.

Polymer C was further compounded as follows:

| | a | b |
|---|---|---|
| Polymer Blend C | 894 | 894 |
| Hydrated amorphous silica (Hardwick) | 44.7 | 44.7 |
| Calcium carbonate | 268.2 | 268.2 |
| Dimethylnaphthalene/formaldehyde resin | 89.4 | 89.4 |
| Calcium stearate | 8.94 | 8.94 |
| Stearic Acid | 4.5 | 4.5 |
| Titanium dioxide | 44.7 | 44.7 |
| Adipic acid | 4.5 | 4.5 |
| Zinc Oxide | 22.4 | 22.4 |
| Chlorinated paraffin oil (Diamond Shamrock) | 44.7 | 44.7 |
| Calcium oxide | 22.4 | 22.4 |
| Magnesium carbonate | 89.4 | 89.4 |
| Diethylene glycol | 8.94 | 8.94 |
| TE 80 (Processing aid, Technical Processing Co.) | 8.94 | 8.94 |
| Isodecyl diphenyl phosphate | 44.7 | 89.4 |

Polymer Blend C, in pelletized form, was charged to a Banbury mixer and melted, whereupon the other ingredients listed above were added, and mixing was continued at 165° C. for 10 minutes. Each blend was then discharged and rolled into a sheet on a roll mill. These materials are referred to as Banbury compounds.

The Banbury compounds were blended with a blowing agent, a blowing agent accelerator, and sulfur curing agents on a roll mill set at 80° C.

The milled compound was taken off the roll as sheets which were cut into strips and fed into a 3.75 cm Royale single screw extruder equipped with a vacuum screw with an L/D ratio of 15 and a streamlined 1.25 cm diameter circular while die and extruded at a melt temperature of about 100° C. The smooth extruded rod was cured in a tunnel with two heating zones, 140° C. and 154° C., with a residence time of 8 minutes in each zone. A soft foam with a smooth outer skin and having a density of 0.16 gm/cm³ was obtained.

EXAMPLE 4

The formulations shown here exhibit greatly improved ozone resistance over nitrile rubber/PVC foams:

TABLE 2

|  | g | % |
|---|---|---|
| Part I |  |  |
| EVACO (65.5:23.5:11) terpolymer | 66.0 | 23.8 |
| PVC (Inherent viscosity 0.93) | 27.2 | 9.9 |
| Ba/Cd Laurate | 0.8 | 0.3 |
| Phosphite Chelator (Argus Chem. Co.) | 0.3 | 0.1 |
| Epoxidized soybean oil | 2.7 | 1.0 |
| Polyethylene Wax (Allied 617A) | 5.1 | 1.8 |
| Stearic Acid | 2.1 | 0.8 |
| Acrylic Processing Aid | 0.8 | 0.3 |
| (Acryloid ® K120, Rohm & Haas) |  |  |
| Titanium dioxide | 70.0 | 25.3 |
| Hydrated Alumina | 30.0 | 10.8 |
| Carbon Black (ASTM N550 FEF) | 10.0 | 3.6 |
| Zinc Oxide | 4.0 | 1.4 |
| Tricresyl Phosphate | 15.0 | 5.4 |
| Dioctyl Phthalate | 20.0 | 7.2 |
| Part II |  |  |
| Surface-Treated Urea (Uniroyal) | 1.5 | 0.5 |
| Azodicarbonamide | 18.0 | 6.5 |
| Sulfur | 1.4 | 0.5 |
| N—cyclohexyl-2-benzo-thiazole sulfenamide | 1.0 | 0.4 |
| Mercaptobenzothiazole | 0.5 | 0.2 |
| Tetramethylthiuram monosulfide | 0.5 | 0.2 |
|  | 276.9 | 100.0 |

PVC, stabilizers, and processing aids (Ba/Cd laurate through Acryloid ® K120 in Table 2) were combined in a high intensity mixer (Welex); then the other ingredients of Part I were combined in a Banbury mixer at 180° C. for 10–15 minutes.

On a roll mill, Part I and Part II were combined at a maximum temperature of about 120° C.

Foams were made by compression molding at 165° C. for 3–5 minutes followed by an oven cure of 9–10 minutes at 170° C.

OZONE DEGRADATION

Samples of a commercial nitrile rubber-PVC foam were compared with the above E/VA/CO-PVC foam in a static ozone exposure test. Ozone concentration was 3 ppm at 37.8° C. Samples 2.5 cm wide, 1.25 cm thick, and 15 cm long were attached at one end and bent over a 5 cm mandrel; a weight was affixed to the free end. Samples were observed after exposure to the ozone, and both failure and failure time were recorded. Samples were checked daily except on weekends. Therefore, a time range is recorded for time to break.

|  | Hours to Break |
|---|---|
| Nitrile-PVC foam | 47–119 |
| Nitrile-PVC foam | 23–47 |
| E/VA/CO-PVC foam | No break after 1879 hours. |

|  | Hours to Break |
|---|---|
|  | Test terminated. |

EXAMPLE 5

The following blends were prepared

|  | Parts |
|---|---|
| Part I |  |
| PVC (Firestone FPC-9300) | 26.8 |
| Ba/Cd Laurate (Argus Chem Co.) | 0.8 |
| Phosphite Chelator (Argus Chem Co.) | 0.3 |
| Epoxidized soybean oil | 2.6 |
| Dioctyl phthalate | 8.0 |
| Polyethylene wax (Allied 6A) | 1.0 |
| Stearic Acid | 0.1 |
| Acryloid ® K-120N (Rohm & Haas) | 0.8 |
| E/VA/CO (65:25:10) terpolymer | 59.5 |
| Talc | 70 |
| Clay | 40 |
| Zinc Oxide | 4 |
| Stearic Acid | 2 |
| Part II |  |
| Azodicarbonamide | 18 |
| Surface-treated urea (Uniroyal) | 1.5 |
| 2-Mercaptobenzothiazole | 0.5 |
| Sulfur | 1.4 |
| N—Cyclohexyl-2-benzothiazole sulfenamide | 1 |
| Tetramethylthiuram monosulfide | 0.2 |
| Carbon Black (ASTM N- 650) | 1 |

PROCEDURE

Part I ingredients were blended in a Banbury internal mixer for 10 min. at 160° C. Ingredients of Part II were blended with the Part I blend on a two-roll rubber mill at 50° C.

The above composition was fed to a single screw intruder operating at 88° C., exiting through a ribbon die into a 6-meter air-heated tunnel with an air temperature of 175° C. The rate of feed was controlled so that the total residence time in the tunnel was 7.5 min. The resulting closed-cell foam had a density of 0.39 g/cm³.

We claim:

1. A process for producing a foamed, cured composition comprising a polymer blend of
   (1) 5 to 95 parts of E/X/Y copolymer, wherein
      E is ethylene;
      X is a vinyl ester; and
      Y is carbon monoxide or sulfur dioxide; and
   (2) 95 to 5 parts of a polymer of a vinyl halide or vinylidene halide, the total amount of polymers (1) plus (2) being 100 parts;
   said process comprising:
   (A) uniformly dispersing in said polymer blend an effective amount of a blowing agent and at least one curing agent selected from
      (a) about 0.2 to 5 parts of sulfur and (b) about 0.2 to 15 parts of an agent capable of releasing elemental sulfur under the cure conditions; and
   (B) heating said blend containing the blowing agent and the curing agent at a temperature of about 100°–180° C., at which both foaming and curing take place, for a sufficient time to obtain substantially complete foaming and curing.

2. A process of claim 1 wherein the E/X/Y copolymer is an ethylene/vinyl acetate/carbon monoxide terpolymer.

3. A process of claim 2 wherein the polymer blended with the E/X/Y copolymer is polyvinyl chloride.

4. A process of claim 4 wherein the curing agent is sulfur.

5. A process of claim 1 which is continuous.

6. A process of claim 1 which is carried out in the presence of air.

7. A process of claim 1 wherein there is also present in the polymer blend a vulcanization accelerator.

8. A process of claim 7 wherein the amount of accelerator is about 0.2–4 parts per 100 parts by weight of polymer blend.

9. A process of claim 8 wherein the amount of accelerator is about 0.5–2 parts per 100 parts by weight of polymer blend.

* * * * *